P. COMINA.
BLOWER DEVICE.
APPLICATION FILED APR. 24, 1920.
1,365,459.
Patented Jan. 11, 1921.
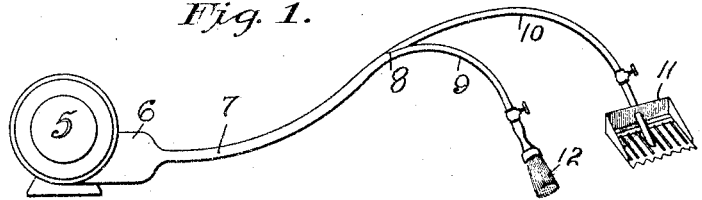
Fig. 1.
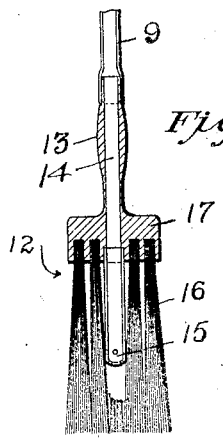
Fig. 5.
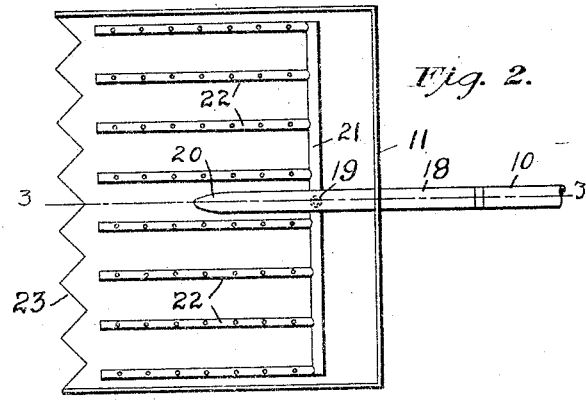
Fig. 2.
Fig. 3.
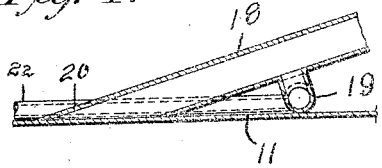
Fig. 4.
WITNESS
L. Olsen
INVENTOR
Peter Comino
BY
Munn & Co.
ATTORNEYS

UNITED STATES PATENT OFFICE.

PETER COMINA, OF APTOS, CALIFORNIA.

BLOWER DEVICE.

1,365,459.  Specification of Letters Patent.  Patented Jan. 11, 1921.

Application filed April 24, 1920. Serial No. 376,407.

*To all whom it may concern:*

Be it known that I, PETER COMINA, a citizen of Switzerland, residing at Aptos, in the county of Santa Cruz and State of California, have invented a new and useful Blower Device, of which the following is a specification.

The present invention relates to a blower device and has reference more particularly to a pneumatic blower device for recovering and cleaning fruit which has dropped on the ground around the base of fruit trees.

The primary object of the invention is to provide a novel means of separating dust, twigs, leaves and other debris from fruit which has dropped to the ground, thus enabling the fruit to be easily recovered.

A further object is to so arrange the device that it may be used in connection with a conventional type of blower apparatus in an exceedingly simple and inexpensive manner.

A still further object of the invention is to so produce the device that it may effectively carry out its intended use.

With these and other objects in view, which will be apparent from the following detailed description, the invention will be described with reference to the illustrative embodiment shown in the accompanying drawing in which:

Figure 1 is a side view of an ordinary type of blower illustrating the invention as applied thereto, the same being shown in perspective;

Fig. 2 is an enlarged plan view of the air pan with the air discharge as used in connection therewith;

Fig. 3 is a longitudinal section on the line 3—3 Fig. 2;

Fig. 4 is an enlarged longitudinal section and

Fig. 5 is a section through the air brush as contemplated as a part of the invention.

Referring now to the drawing in detail by the arrangement it is proposed to employ a blower 5 of any desirable construction having a discharge to which is secured connection 6 of the air conduit 7 which may be constructed of any convenient tubing and of any length to meet requirements. Conduit 7 is constructed with a branch connection as at 8 to provide a tube 9 and a second tube 10, terminating in a connection with an air pan 11 whereas the tube 9 terminates in a connection with an air brush 12. The tube 9 receives the tubular handle 13 of the brush which handle is provided with an internal bore or air tube 14 which terminates in a discharge nozzle 15 surrounded by the brush structure 16 of the brush which in turn is embedded and carried by the mounting 17.

The air pan 11 is constructed with a hollow handle 18 which is constructed with an outlet 19 and terminates as at 20 in the middle of the pan to add rigidity to the structure. The outlet 19 communicates with the manifold 21 which extends transversely of the pan and which in turn communicates with a series of parallel arranged branch piping 22 each of which having a series of perforations to act as upwardly presented discharges. The open end of the pan is serrated as at 23.

In using the invention the pan 11 may be manipulated to scoop up a quantity of the debris, with the aid of the brush 12, from around the base of fruit trees. The fruit which has fallen from the trees and has mingled with the debris can in this manner be recovered as the air pressure which is discharged through the pan will blow away the debris leaving the separated fruit in the pan. If desirable, the brush 12 may be used to agitate the contents of the pan to facilitate the separation of the debris. In order that the discharge of air through the brush and pan may be selectively controlled, the branch tubing 9 and 10 may be provided with stop cocks.

I claim:

1. A device of the character described including an air conduit, having a branch connection dividing the conduit into a plurality of separate conduits, and an air brush and air pan carried by and having an air discharge for each one of the said conduits, and capable of independent manipulation as a pneumatic blower device.

2. A device of the character described including a plurality of air conduits, means carried by and having an air discharge for each one of the said conduits capable of independent manipulation as a pneumatic blower device, said means comprising an air pan having a series of air discharges throughout its area, and an air brush.

3. A device of the character described and as set forth in claim 2, and in which a communication is established between the air conduit of the air pan through the handle thereof, and through the handle to the series of air discharges in the pan area, and in which the communication to the air brush is established through the handle of the brush, the same terminating in and surrounded by the brush structure.

PETER COMINA.